Figure 1:
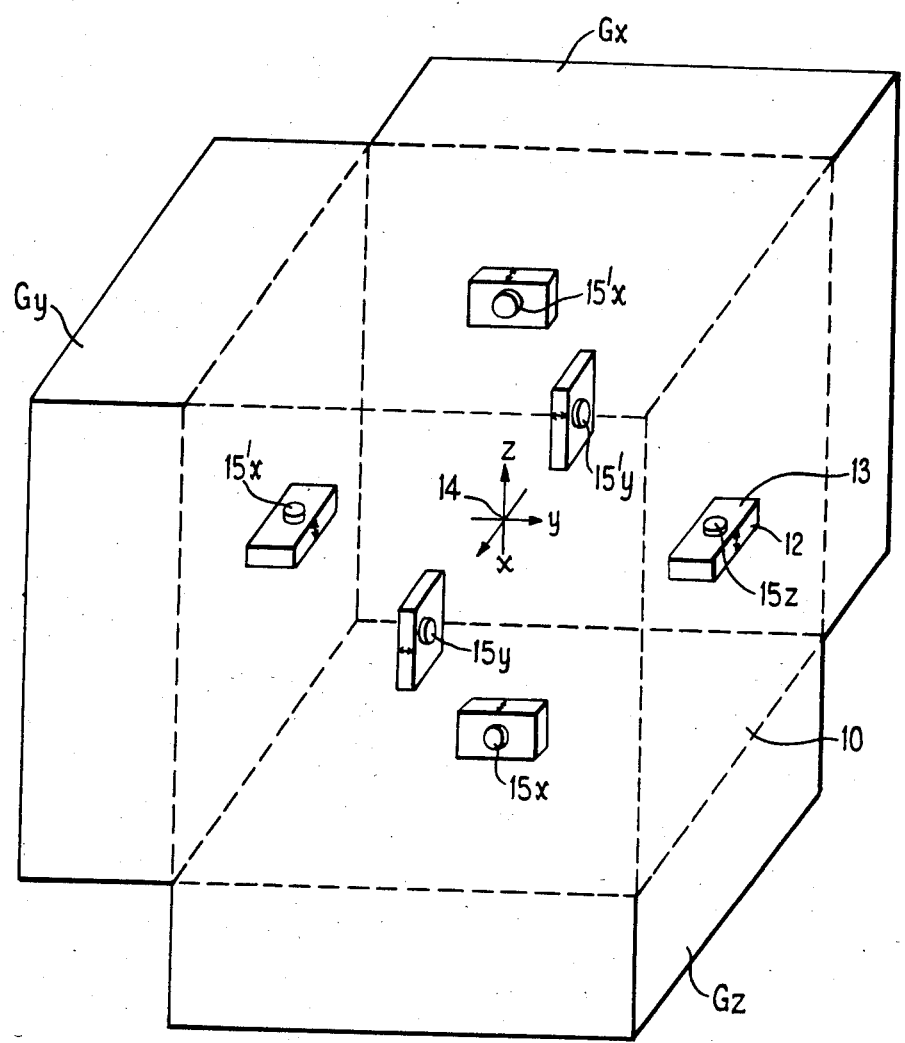

United States Patent [19]

Watson

[11] Patent Number: 4,601,206
[45] Date of Patent: Jul. 22, 1986

[54] ACCELEROMETER SYSTEM

[75] Inventor: Norman F. Watson, South Queensferry, Scotland

[73] Assignee: Ferranti plc, Cheshire, England

[21] Appl. No.: 650,648

[22] Filed: Sep. 14, 1984

[30] Foreign Application Priority Data

Sep. 16, 1983 [GB] United Kingdom ............... 8324856

[51] Int. Cl.⁴ ............................................. G01P 15/00
[52] U.S. Cl. .................................. 73/514; 73/517 A; 73/510; 73/505
[58] Field of Search ............... 73/514, 517 A, 510, 73/505

[56] References Cited

U.S. PATENT DOCUMENTS 2,996,268 8/1961 Brown et al. ...................... 73/514

FOREIGN PATENT DOCUMENTS 2146775 4/1985 United Kingdom .
0574677 9/1977 U.S.S.R. .......................... 73/517 A Primary Examiner—Anthony V. Ciarlante
Attorney, Agent, or Firm—Kerkam, Stowell, Kondracki & Clarke

[57] ABSTRACT

An inertial platform accelerometer cluster (FIG. 1) comprises a cluster of gyro and accelerometer system triads disposed in a cluster housing 10 to detect motion along and about orthogonal x, y and z axes. The orthogonal accelerometer systems each comprises a pair of codirectional accelerometers e.g. 15x, 15'x having an operating bandwidth from 0 to several KHz mounted on the housing walls equidistant from a point 14, which represents a common center of percussion to all pairs, at the center of gravity of the cluster. The analogue output signals of each accelerometer pair are scaled, summed and differenced to provide 'sum' and 'difference' signals which represent respectively acceleration in the sensitive direction and angular acceleration about an orthogonal axis. The sum and difference signals can be used in analogue correction generating circuitry to obtain correction signals for coning and sculling effects, for which responses at high-frequency are called for, while economizing on computer time and capacity. Furthermore the coincidence of the center of percussion for all accelerometer pairs eliminates size effect errors from the 'sum' signal which is employed for the normal inertial platform computations. Separate high- and low-frequency responsive accelerometers may be used.

14 Claims, 3 Drawing Figures

ACCELEROMETER SYSTEM

This invention relates to accelerometer systems and in particular to accelerometer systems associated with inertial platforms.

Inertial platform structures may take many forms, one configuration being a platform arrangement used in an inertial navigation system of a host vehicle, in which arrangement an orthogonally sensitive triad of dithered ring laser gyroscopes and an orthogonally sensitive triad of accelerometers are mounted in a common rigid structure known as a cluster. The platform and cluster may be held rigidly with respect to the host vehicle the gyros and accelerometers sensing angular and translational accelerations of the platform and vehicle in space as the vehicle manoeuvres. The signals produced by the gyros and accelerometers are usually fed to a processing computer which by the application of suitable algorithms defines the vehicles motion. This known processing of the signals by computer will be referred to in the specification but no details thereof are given as this forms part of the art and not of the present invention.

Ideally the cluster accelerometers should be subjected only to components of vehicular accelerations which are unidirectional or vibrational at relatively low frequencies (less than a few tens of Hz) and what are generally known as Inertial Quality accelerometers are designed to respond accurately at low-frequency variations in acceleration at the expense of a poor high-frequency response. In this specification the term 'low-frequency accelerometer' is used to refer to such an inertial quality accelerometer.

However, constraints on the positioning of three single-axis accelerometers and gyros within a cluster construction means that additional accelerations are sensed which give rise to erroneous acceleration measurements unless they are compensated for or eliminated.

Such sources of error and the equations defining their solution are well documented in the text books, for example "Inertial Guidance Engineering" published by Prentice-Hall Inc. Englewood Cliffs, N.J. U.S.A.

Two such sources of error are due to the so called coning effect, caused by motions of the gyros input axes giving rise to angular acceleration measurement errors and the sculling effect, by which linear and angular vibrations at relatively high frequencies of hundreds of Hz along two orthogonal axes produce a steady linear acceleration along the third orthogonal axis.

To compensate for these errors corrections must be applied to the angular and linear acceleration as measured by the gyros and inertial quality accelerometers requiring measurement and processing of signals which give rise to the effect.

In the case of sculling effects, for instance the resultant steady linear acceleration is within the operating bandwidth of the inertial quality accelerometer but results from vibrational accelerations in orthogonal axis at frequencies above those to which conventional inertial quality accelerations can respond. It is these high-frequency accelerations, (and corresponding high-frequency angular motions for coning effect) which have to be measured and processed and an accelerometer capable of measuring such high-frequency vibrational accelerations is hereinafter referred to as operable in a 'high-frequency range'.

Whereas the cluster may be mechanically isolated from the system housing, and host vehicle, by anti-vibration elastic mounts such isolation is never complete and accelerations induced by the host vehicle and modified by the mounts can act on the cluster and introduce the above identified vibrational accelerations.

Furthermore, reaction torques from gyro dither mechanisms can cause angular motions of the cluster about the centres of gravity of the cluster at dither frequencies of several hundred Hz. Theoretically such angular motions may be discounted by locating the accelerometers at the centre of gravity but in practice the bulk of the instruments prevents such ideal location and to define the motion of the cluster it is necessary to take into account the linear acceleration components of motion caused by displacement of the accelerometer from the ideal position and perform size effect calculations on the measured linear and angular accelerations to refer the acceleration measurements back to a single point in the cluster.

Such size effect calculations are conventional in nature and readily performed by suitable known algorithms applied by the processing computer of the system but the implementation of the algorithms i.e. the data used in the calculations depends upon the characteristics of the individual accelerometers and gyros and such algorithms are thus not readily adaptable to solution by computer in the event of any instrument change. Also, to perform size effect corrections accurately measurement of such vibrational accelerations requires a measurement bandwidth extending up to several KHz. The computing capacity and computing time required to deal with such errors over a wide bandwidth constitutes an important factor in the cost and operating performance of the system.

It is an object of the present invention to provide an inertial platform accelerometer cluster by which error effects outlined above can be eliminated and/or measurement signals for their correction be more readily obtained than in known systems and also an inertial platform incorporating such an accelerometer cluster.

According to a first aspect of the present invention inertial platform accelerometer cluster comprises associated with each of three orthogonal axes an accelerometer system including at least one accelerometer operable in a low-frequency range (as herein defined), a pair of accelerometers operable in a high-frequency range (as herein defined) disposed equidistantly about a centre of percussion common to the other orthogonal axes and the centre of gravity of the cluster, and signal processing means operable to produce from the sum of the signals from said pair of (high-frequency) accelerometers a sum signal representative of vibrational acceleration of the cluster along said axis and operable to produce from the difference between the signals from said pair of (high-frequency) accelerometers a difference signal representative of the angular acceleration of the cluster about one of said orthogonal axes.

According to a second aspect of the present invention an iertial platform comprises an accelerometer cluster as defined in the preceding paragraph, including an orthogonal triad of gyros, and processing means responsive to signals received from the gyros and accelerometer systems to compute the motion of the platform in three dimensional space.

Figure 2:
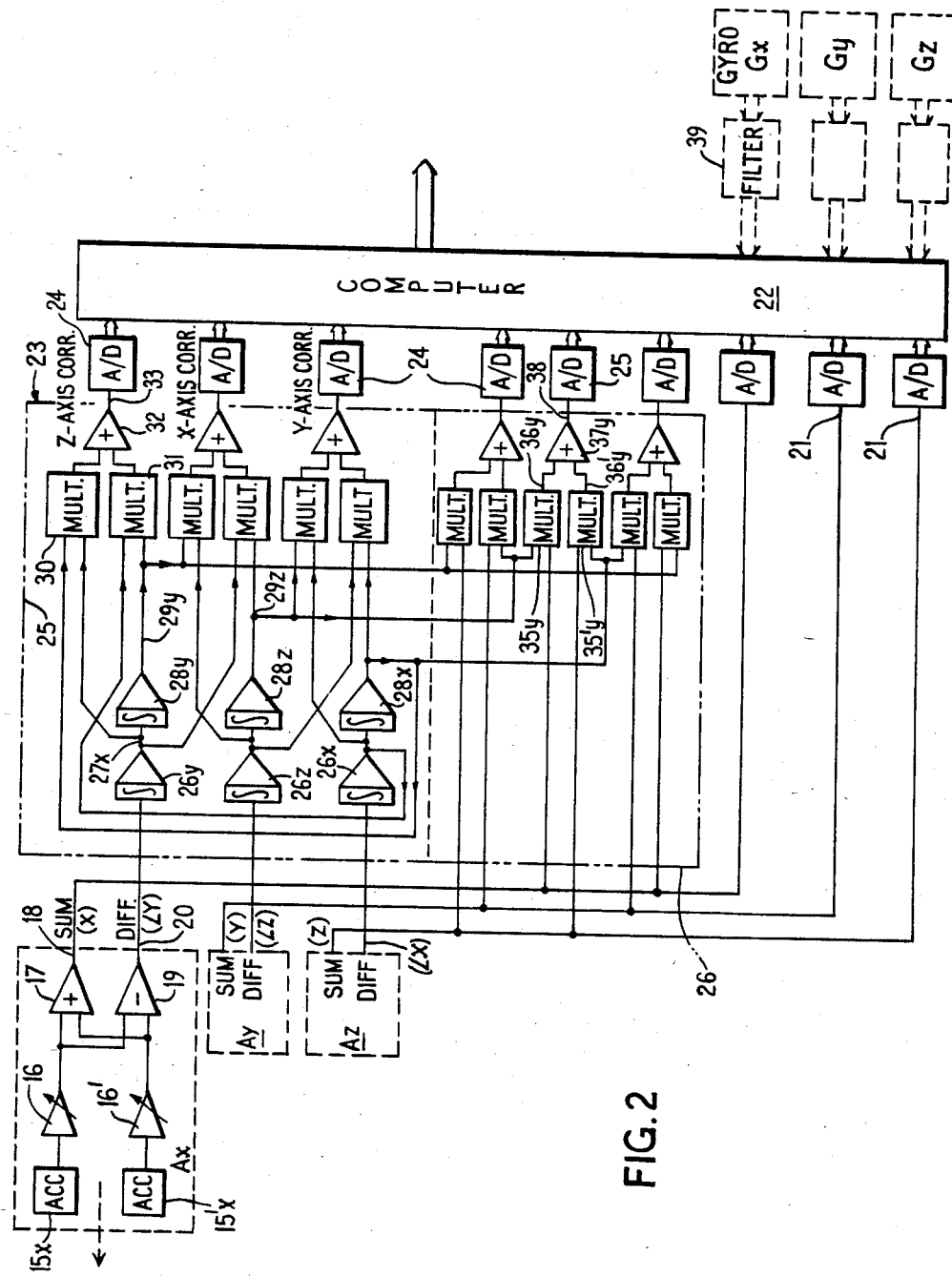
Figure 3:
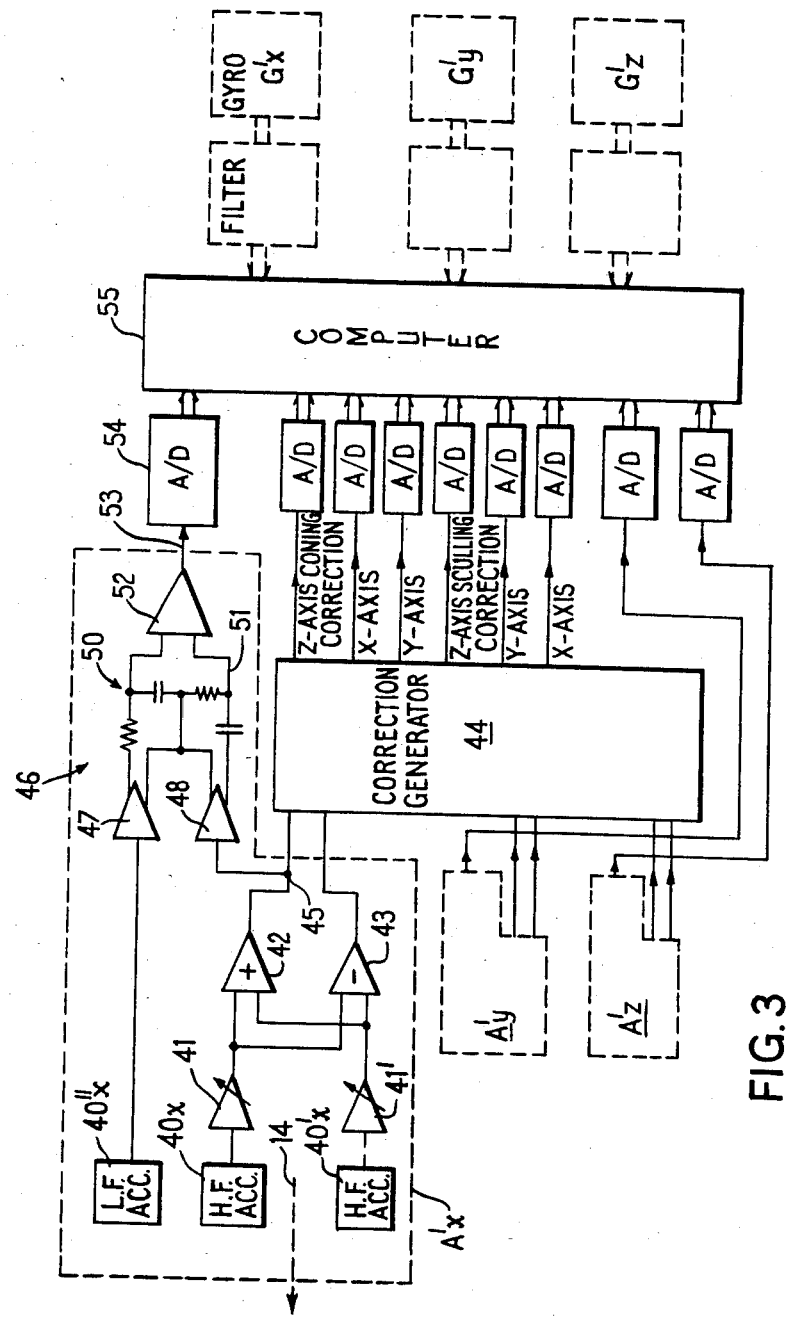

Embodiments of the invention will now be described by way of example with reference to the accompanying drawings, in which:

FIG. 1 is a perspective representation of an (gyro and) accelerometer system cluster associated with an inertial platform in accordance with the present invention, FIG. 2 shows a schematic representation of an inertial platform including a first form of single-axis accelerometer system in accordance with the present invention, and FIG. 3 shows a schematic representation of an inertial platform including a second form of single-axis accelerometer system.

Referring to FIG. 1 an inertial platform includes a gyro and accelerometer cluster formed within a hollow cube structure 10. Mounted on three of the external walls are gyro packages Gx, Gy, and Gz each containing a known form of mechanically dithered ring laser gyro. The internal faces of cube walls 11 carry mounting blocks 12 located near the centres of the wall faces to provide planar mounting faces 13 extending perpendicularly to the plane of wall.

The blocks are in pairs associated with opposite wall faces and are so located that the mounting faces of each pair are co-planar, said plane extending through the cube structure orthogonally to the other two planes, all three planes intersecting at the centre of gravity 14 of the cluster.

Each of the mounting faces 13 carries an accelerometer, the accelerometers being indicated as 15x, 15'x, 15y, 15'y, 15z and 15'z in accordance with their sensitive axes, indicated by arrows on the mounting blocks, extending in the direction of the coordinate x, y and z axes indicated at 16.

It will be seen that in each pair the accelerometers 15 and 15' are disposed equi-distantly each side of the centre of gravity 14.

It will be appreciated that when the cluster undergoes a translational acceleration, say in the x-direction, the average of the signals from the accelerometers 15x and 15'x (a function of their sum) is a measure of the translational acceleration in that direction. If the motion includes a rotation about the y-axis then the signal from the accelerometers 15x and 15'x are subtractive and represent by their difference the angular acceleration about the axis. It will be appreciated that the signal difference between accelerometers 15y and 15'y represents angular acceleration about the z-axis and the signal difference between accelerometers 15z and 15'z represents angular acceleration about the x-axis.

Referring now to FIG. 2 which shows an accelerometer system Ax including two accelerometers 15x and 15'x associated with the x-axis. The accelerometers are single-axis devices identical in construction and each has an operating bandwidth extending from zero to several KiloHertz and provides an output signal in analogue form. A suitable device is the Sundstrand QA2000 quartz flexure accelerometer manufactured by Sundstrand Data Control Inc., Redmond, Wash., U.S.A.

The output signals of devices 15x, 15'x related to the magnitude of acceleration are fed to scaling amplifiers 16, 16' where the relative amplitudes of the accelerometers are matched and scaled.

The output of the amplifiers 16 and 16' are fed to a summing amplifier 17, the output 18 of which is proportional to the sum of the accelerometer signals, and is a function of the translational, or linear, acceleration of the cluster along the x-axis.

The outputs of the amplifiers 16 and 16' are also fed to inputs of a differencing amplifier 19, the output 20 of which, proportional to the difference between the accelerometer signals, is a function of the rotational acceleration of the cluster about the y-axis.

The 'sum' signal from output 18, which includes all translational accelerations of the cluster in the x-direction is also applied by way of an A/D converter 21 to a processing computer 22 which receives also the corresponding 'sum' and 'difference' signals from the other accelerometer systems Ay and Az and gyros Gx, Gy and Gz of the cluster to perform the computations to define the motion of the cluster due to motion of the vehicle in conventional manner.

The 'sum' and 'difference' signals are in analogous form and applied to a conventional correction generating circuit 23 for calculating coning and sculling errors by the use of analogue circuitry.

Signals relating to errors as determined are applied to the computer 22 by way of A/D converter 24 and used to modify the readings of the accelerometers and gyros to compensate for said coning and sculling motions.

The corrections performed by the correction generating circuit 23 are not part of the invention, representing solution of known correction defining equations, but the form of circuit is described briefly for the sake of completeness.

The circuit 23 is divided into two sections 25 and 26. The upper section 25 produces correction signals for coning effects about the three axes, the coning rate about a particular axis, say z, being definable as [(angle of rotation about y-axis)×(angular rate of rotation about x-axis)]+[(angle of rotation about x-axis)×(angular rate of rotation about the y-axis)], corresponding relationships holding for coning rates about each of the x and y axes. The difference signal from x-axis accelerometer system Ax represents the angular acceleration about the y-axis so that a first time integral of the signal represents the angular rate of rotation and a second time integral represents the angle of rotation about the y-axis.

The output 20 of accelerometer system Ax (relating to rotation about the y-axis) is applied to a first stage integrator 26y having an output terminal 27y connected to a second stage integrator 28y having an output 29y. The output 27y of the first stage integrator is also connected to one input of a multiplier 30 a second input being connected to the output of a second stage integrator 28x (receiving x-axis signals from accelerometer system Az). The output 29y of the second stage integrator is connected to one input of a multiplier 31 a second input to the multiplier being connected to the output of first stage integrator 26x. The product signals are added in a summing amplifier 32, the signal appearing at output 33 representing the coning rate about the z-axis. The analogue signal is applied to the A/D converter 24 and thence computer 22 as described above.

Corresponding "difference" signals from accelerometers Ay and Az are applied to first stage integrators 26z and 26x respectively.

The other integrator stages are correspondingly coupled by way of multipliers and summers to provide x-axis and y-axis coning rate signals.

The lower portion 26 of correction generating circuit 23 provides correction signals for sculling errors, which for an axis, say the y-axis, may be defined as [(angular displacement about the z-axis)×(linear acceleration along the x-axis)]+[(angular displacement about the x-axis)×(linear acceleration along the z-axis)]. Multiplier 35y has a first input connected to the output 29z of second stage integrator 28z to receive signals representing displacement about the z-axis and a second input connected to the 'sum' output 18 of accelerometer system Ax to receive signals representing the linear acceleration along the x-axis. Multiplier 35′y has a first input connected to the output 29x of second stage integrator 28x to receive signals representing displacement about the x-axis and a second input connected to the 'sum' output of the accelerometer system Az to receive signals representing the linear acceleration along the z-axis. The product signals appearing on multiplier output lines 36y and 36′y are applied to a summing amplifier 37y and the output signal of the amplifier on line 38 representing the sculling correction is applied by way of A/D converter 24 to the computer 22. Corresponding multiplier pairs 35x, 35′x and 35z, 35′z receive second stage integrator signals and accelerometer 'sum' to produce signals from their associated summing amplifiers 37x and 37z sculling compensation signal for the x and z-axes respectively. The relative amplitudes of the signals receives from the accelerometer systems and the integrators 28 may require adjustment by suitable amplifiers or attenuators (omitted for clarity).

The use of analogue signals and analogue circuitry, particularly the analogue multipliers, in the correction generating circuit 23 frees the computer 22 from performing corresponding calculations digitally thus saving considerable computer processing time.

Whereas the sculling compensation signals as shown being applied to the computer which employs them to effect corrections to the linear accelerometer signals (derived from the 'sum' signals) it will be appreciated that the analogue signals on lines 38 may be suitably scaled and mixed with the analogue 'sum' signals from the accelerometer systems thereby reducing the number of inputs of the computer and the amount of digital processing.

The use of accelerometers to derive the high-frequency angular motion measurements in analogue form makes it possible to employ digital filters 39 on the digital output of the ring laser gyros to eliminate high-frequency gyro errors and noise to obtain the essentially low-frequency variations associated with host vehicle motion required by the computer 22.

The main benefit of the cluster arrangement described is that although the individual accelerometers are mounted with their centres of percussion displaced from each other the centre of percussion of each of the three orthogonal accelerometer systems can co-exist at the centre of gravity 14 of the cluster thereby eliminating completely the necessity to perform size effect correction on the accelerometer signals and simplifying the cluster arrangement even further.

Not only does the above described arrangement of accelerometer systems simplify the inertial platform structure but also enables the provision of additional facilities. For instance, whereas the measurement of low-frequency angular motions of the cluster is essentially performed by the gyros and the high-frequency measurement of angular motions (for error correction) by the accelerometer systems there may be overlap in their operating ranges so that comparisons may be made between the signals produced to determine the accuracy and/or stability of the measurement systems. Also a form of self-checking may be provided between the component accelerometers of each accelerometer system. Self checking means (not shown) may be provided including integration means to integrate the accelerometer outputs with a long time constant (to remove the differential effects of vibrational rotation) and compare the results to establish conformities between the accelerometer responses.

The inertial platform cluster arrangement described above with reference to FIG. 2 employs two wide bandwidth accelerometers each responding both to low-frequency 'inertial' movements of the host vehicles and to the high-frequency vibrational movements of the cluster and any induced by the host vehicle.

It will be appreciated that accelerometers having such a wide response bandwidth are complex and inherently expensive devices. An alternative arrangement showing details of one single-axis accelerometer system is illustrated in FIG. 3.

The accelerometer system A′x associated with the x-axis comprises a pair of piezoelectric accelerometers 40x and 40′x having a 'high' frequency response, say in a bandwidth extending from 3 Hz to 2 KHz but unsuitable for detecteing the steady and low-frequency accelerations associated with movements of the host vehicle. Suitable accelerometers are type 2250A manufactured by Endevco Corp., San Juan Capestrano, Calif., U.S.A. The 'high-frequency' accelerometers, as they are referred to in this specification, are disposed similarly to the accelerometers 15x and 15′x described above in relation to FIG. 2, that is, equi-distantly from the centre of gravity point 14 at opposite sides thereof with their sensitive axes codirectional in the direction of the x-axis. The accelerometer system also includes a separate 'low-frequency' accelerometer 30″x which is a conventional commercial inertial quality instrument, such as the type FA2 made by the applicant company, having a frequency response bandwidth extending from 0 to greater than 50 Hz.

The outputs of the two high-frequency accelerometers 40x and 40′x are fed by way of scaling amplifiers 31 and 31′ to summing and differencing amplifiers 42 and 43 respectively whose outputs are connected to an correction generating circuit 44 corresponding to the circuit 23 of FIG. 2.

The output 45 of the summing amplifier 42 is also connected to feed signals to a combining circuit 46, to which circuit the analogue output signals of the low-frequency accelerometer 40″x are also fed.

The high- and low-frequency accelerometer signals are suitably scaled in amplifiers 47, 48 respectively which amplifiers have differential outputs. One output of each amplifier is connected to the other and provides a common rail 44 for a low-pass filter 50, connected to receive signals from amplifier 47, and for a high-pass filter network 51, connected to receive signals from amplifier 48. The filter outputs are connected to two inputs of a combining amplifier 52 which has an output 53 providing accelerometer signals, extending over the combined bandwidth, to an A/D converter 54 and hence to a computer 55 corresponding to the computer 22 of FIG. 2. The components of the filter networks are chosen to give a cross-over frequency of approximately 10 Hz.

Corresponding accelerometer systems A′y and A′z also produce 'sum' and 'difference' signals for the correction generating circuit 44 high- and low-frequency linear response signals for input to computer 55.

It will be appreciated that within this combined accelerometer signal only vibrational components from accelerometer 40″x at less than the 10 Hz cross-over frequency are subject to size effect errors so that even though the computer requires to contain a size effect correction algorithm it is less complex and requires relatively little computing capacity by virtue of its restriction a range of frequencies below 10 Hz. Measurement of the size effect errors may be further simplified if the low-frequency accelerometer associated with one of the axes is located at the centre of gravity 14 so that it suffers no size effect errors and compensation algorithms have to be applied in respect of the other two low-frequency accelerometers only.

Thus the formation of an inertial platform cluster employing accelerometer systems in which at least the high-frequency responsive parts are symetrically displaced to have common centres of percussion coincident with the centre of gravity of the cluster enables translational and rotational vibrations to be determined and employed to eliminate sources of error, such as coning and sculling effects, in analogue form and to greater advantage than digitally in the conventional processing computer whilst eliminating, or at least reducing size effect errors.

Means may be provided as outlined above for self checking between the high-frequency accelerometers of each system. Further self-checking means (not shown) may also be provided where there is overlap in the operating bands of the high- and low-frequency accelerometers. Signals in the common band may be isolated by respective band-pass filters and compared to establish a departure from conformity of response.

Also it has been shown that accelerometer systems may be formed of wide bandwidth accelerometers or combinations of accelerometers having restricted bandwidth. Copending commonly-assigned Watson U.K. Patent Application No. 8324855, filed Sept. 16, 1983, published on Apr. 24, 1985 as No. 2,146,775A, describes a single-axis accelerometer system comprising a single low-frequency inertial quality accelerometer and a high-frequency accelerometer whose outputs are scaled and coupled by way of a cross-over filter to give a unified output extending over the wide operating band described above; that is, similar to the accelerometers 40"x, 40x and combining unit 46. Since a self-contained accelerometer system can be produced calibrated to provide a desired response over the whole bandwidth it is more readily replaced in a system than can individual accelerometers with different characteristics.

It will be appreciated that such a self contained accelerometer system could be used in pairs as an alternative form of wide bandwidth accelerometer described with reference to FIG. 2.

I claim:

1. An inertial platform accelerometer cluster having three orthogonal axes, said accelerometer cluster comprising an accelerometer system associated with each of the three orthogonal axes, each accelerometer system including:
   at least one means for sensing inertial accelerations, said means for sensing inertial accelerations being responsive to accelerations in a frequency range extending down to zero Hertz;
   a pair of means for sensing vibrational accelerations, each of said means for sensing vibrational accelerations being responsive to vibrational acceleration in a range of relatively higher frequencies causing coning and sculling effects in the inertial accelerometers of said cluster, said pair of means for sensing vibrational accelerations being disposed equidistantly about a centre of percussion common to the other orthogonal axes and the centre of gravity of the cluster; and
   signal processing means operable to produce from the sum of the signals from said pair of means for sensing vibrational accelerations a sum signal representative of vibrational acceleration of the cluster along said axis and operable to produce from the difference between the signals from said pair of means for sensing vibrational accelerations a difference signal representative of the angular acceleration of the cluster about one of said orthogonal axes.

2. An accelerometer cluster as claimed in claim 1 in which the signal processing means includes:
   scaling means operable to control the absolute and relative amplitude of the signals produced by said pair of means for sensing vibrational accelerations;
   a summing amplifier responsive to said scaled signals to produce a sum signal related to the algebraic average of the signals; and
   a differential input amplifier responsive to difference in magnitude and polarity between said scaled signals to produce said difference signal.

3. An accelerometer cluster as claimed in claim 1 in which the cluster includes a closed cubical housing structure, said pair of means for sensing vibrational accelerations associated with each of the three coordinate axes being carried on internal opposite faces of the housing structure.

4. An accelerometer cluster as claimed in claim 1 including self-checking means operable to compare the signals produced by said pair of means for sensing vibrational accelerations in the frequency range of said pair of means for sensing vibrational accelerations integrated over a time period long in relation to that of rotational motion between said pair of means for sensing vibrational accelerations and to give an indication of any difference in their responses.

5. An accelerometer cluster as claimed in claim 1 in which each accelerometer system comprises two accelerometers each responsive both to inertial accelerations in the frequency range extending down to zero Hertz and to vibrational accelerations in the range of frequencies causing coning and sculling effects in the accelerometers of the cluster.

6. An accelerometer cluster as claimed in claim 1 in which each accelerometer system comprises separate inertial and vibrational accelerometers for respectively sensing inertial and vibrational accelerations.

7. An accelerometer cluster as claimed in claim 6 in which the inertial accelerometer of one accelerometer system is located at the centre of gravity of the cluster.

8. An accelerometer cluster as claimed in claim 6 including combining means responsive to the sum signals of the processing means and signals of the inertial accelerometer to produce a unified acceleration related signal extending over a bandwidth including the operating frequency ranges of the component inertial and vibrational accelerometers.

9. An accelerometer cluster as claimed in claim 8 in which the combining means comprises a cross-over filter network including low-pass filter means connected to receive signals from the inertial accelerometer and pass signals at frequencies below a predetermined cross-over frequency and high-pass filter means connected to receive signals from the summing means of the processing means and pass signals above said cross-over frequency.

10. An accelerometer cluster as claimed in claim 6 including further self-checking means comprising filter means operable to pass signals from the inertial accelerometer and signals from the vibrational accelerometers in a band common to both types of accelerometer, and comparison means operable to compare the signals received from each type of accelerometer and indicate any difference in their response.

11. An inertial platform including a cluster formed by orthogonal gyros, an accelerometer cluster as claimed in claim 1 and computing means responsive to signals received from the gyros and accelerometer systems to compute the motion of the platform in three dimensional space.

12. An inertial platform as claimed in claim 11 including analogue correction generating means responsive to said 'sum' and 'difference' signals from each accelerometer system to provide correction signals, in respect of coning and sculling motions by the cluster, for processing in connection with the accelerometer and gyro signals.

13. An inertial platform as claimed in claim 12 including cross-checking means responsive to signals from the gyros indicative of motion about said coordinate axes and to signals from the accelerometer cluster also indicative of motion about said coordinate axes to compare the responses of co-responding instruments.

14. An inertial platform as claimed in claim 11 including cross-checking means responsive to signals from the gyros indicative of motion about said coordinate axes and to signals from the accelerometer cluster also indicative of mmotion about said coordinate axes to compare the responses of corresponding instruments.

* * * * *